United States Patent [19]

Young

[11] 4,178,807
[45] * Dec. 18, 1979

[54] ADAPTER FOR RECIPROCAL LEVER FRICTION DRIVE MECHANISM FOR UNIDIRECTION DRIVE

[76] Inventor: Timothy T. J. Young, 788 Walnut St., Apt. 2, San Carlos, Calif. 94070

[*] Notice: The portion of the term of this patent subsequent to Mar. 10, 1995, has been disclaimed.

[21] Appl. No.: 840,970

[22] Filed: Oct. 11, 1977

Related U.S. Application Data

[63] Continuation-in-part of Ser. No. 628,074, Nov. 3, 1975, Ser. No. 739,351, Nov. 5, 1976, Pat. No. 4,117,915, and a continuation-in-part of Ser. No. 810,948, Jun. 29, 1977.

[51] Int. Cl.² ................................................ F16H 11/00
[52] U.S. Cl. ................................ 74/217 B; 280/255; 192/45
[58] Field of Search .............. 74/219, 217 B; 280/255, 280/258, 246; 192/45.1

[56] References Cited

U.S. PATENT DOCUMENTS

| 533,912 | 2/1895 | Moise | 74/219 |
|---|---|---|---|
| 565,556 | 8/1896 | Murray | 280/246 |
| 3,066,778 | 12/1962 | Maurer | 192/45.1 |
| 3,075,623 | 1/1963 | Lund | 192/45.1 |
| 3,599,767 | 8/1971 | Sederquist | 192/45.1 |
| 4,063,747 | 12/1977 | Young | 280/255 |

FOREIGN PATENT DOCUMENTS

| 340345 | 7/1904 | France | 280/258 |
|---|---|---|---|
| 999915 | 2/1952 | France | 280/258 |
| 17811 | of 1896 | United Kingdom | 280/258 |
| 10500 | of 1897 | United Kingdom | 280/258 |
| 18553 | of 1897 | United Kingdom | 280/258 |
| 9788 | 5/1905 | United Kingdom | 280/258 |
| 459800 | 1/1937 | United Kingdom | 280/258 |

*Primary Examiner*—Samuel Scott
*Assistant Examiner*—Wesley S. Ratliff, Jr.

[57] ABSTRACT

An adapter for reciprocal lever friction drive mechanism comprises one first element as driven-driver, and one second element as the driver. The adapter consists of a pair of mechanism, one fixed at one end of the drive shaft, and the other fixed at the other end of the drive shaft, on which means of transmission of power generated is fitted. Each first element has a band shell for cylindrical friction drive engagement means fixed to it. Adjacent to each first element is disposed a second element coaxial with the first element. Each second element consists of a plural number of links pivoting about the drive shaft, and connecting with cams substantially engaging the cylindrical friction drive engagement means, and the cams pivoting on pinshafts disposed on the links. The turn of the second element in one direction engages the first element in friction drive while the turn of the second element in the opposite direction disengages the friction engagement, for reciprocal operation to turn the shaft in unidirectional motion.

1 Claim, 5 Drawing Figures

ADAPTER FOR RECIPROCAL LEVER FRICTION DRIVE MECHANISM FOR UNIDIRECTION DRIVE

This is a continuation-in-part of my applications Ser. No. 628,074 filed Nov. 3, 1975 now at issue deferred, and No. 739,351 filed Nov. 5, 1976, U.S. Pat. No. 4,117,915 issued Oct. 3, 1978; and A C-I-P of Ser. No. 810,948, June 29, 1977.

The present application encampasses a different embodiment of the noiseless ratchet drive mechanism with novelty features. These four applications are fraternal in that the noiseless ratchet drive mechanism all have the common essential feature of the driver prescribes a smaller angular displacement distance to turn the driven-driver over a greater angular displacement distance in relative rotation.

It is the object of the present improvement to make a noiseless ratchet drive mechanism by pedalling oscillationwise to generate power to impart rotary motions through transmission for unidirectional drive. This invention is particularly but not exclusively intended for a man-powered vehicle such as a pedal-operated bicycle or the like. Other objects and advantages will appear as the specification unfolds. The novel features of the present invention will be set forth in the appended claims.

Figure 3A:
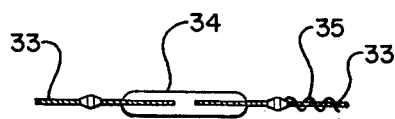
Figure 3B:
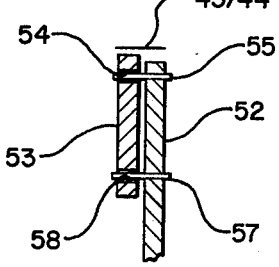
Figure 3:
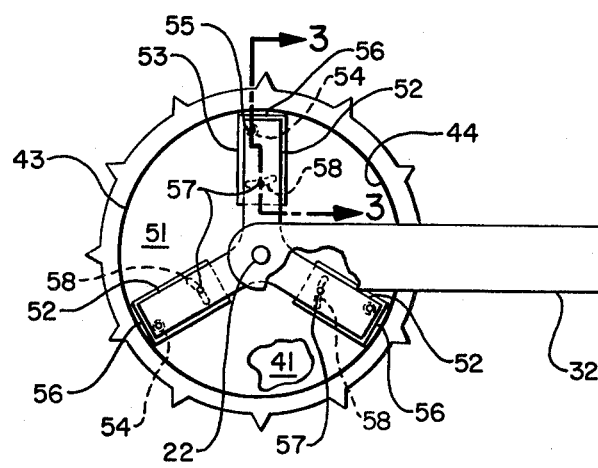
Figure 3:
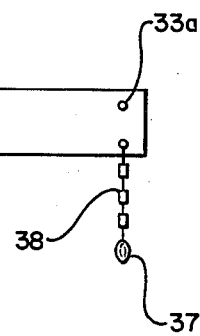

FIG. 3, 3-A are the noiseless ratchet drive mechanism with lever arm and accessories FIG. 3-B is a cut-away view along vertical plane 3—3 of FIG. 3.

Referring now to the drawing in detail, I have disclosed a conventional bicycle having a supporting frame with an upper tube 10, a lower front tube 11 that is inclined relative to the horizontal, and a rear upwardly extending tube 12. The supporting frame has a front fork 14 journaled therein and this fork is provided with a front wheel 15 which may be steered by handle bar 16. Upper and lower rear forks 17 and 18, respectively, of the supporting frame has an axle 19 mounted thereon for a rear wheel 20.

Figure 1:
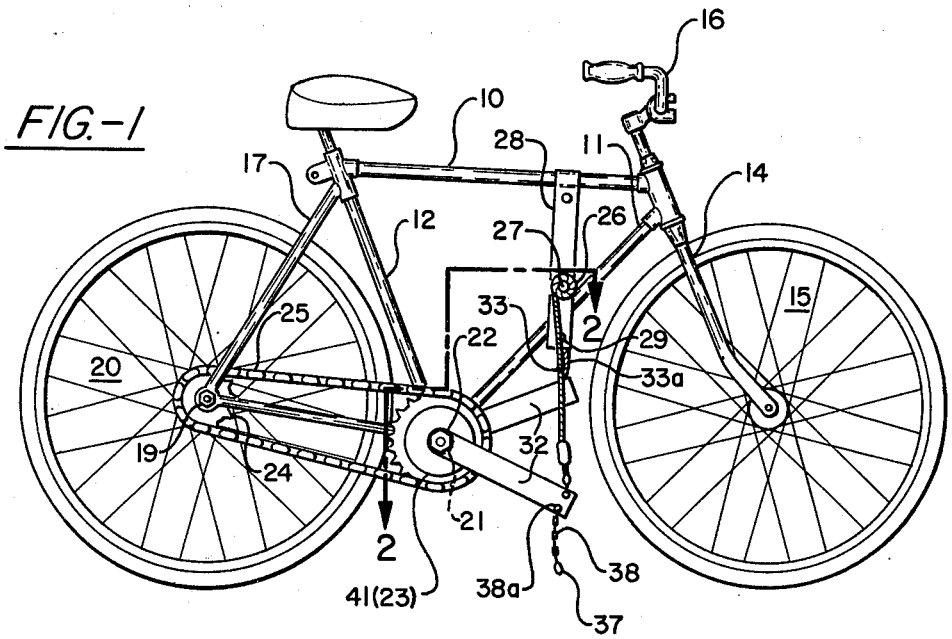
FIG. 1 is a side elevation view looking at the right side of a bicycle equipped with my improved noiseless ratchet drive mechanism.

As shown in FIG. 1 tubes 11 and 12 and the fork 18 provided a support for a transverse bearing tube 21. It will be apparent from FIG. 1 that a drive shaft 22 is journaled in this bearing tube and has a drive sprocket 23 fixed thereto. The ground engagement rear wheel 20 is provided with a driven sprocket 24 on its axle 19, and an endless chain 25 is trained over the drive and driven sprockets 23 and 24, respectively so that rotation of the drive sprocket will actuate the drive sprocket to propel the bicycle or the like.

Figure 2:
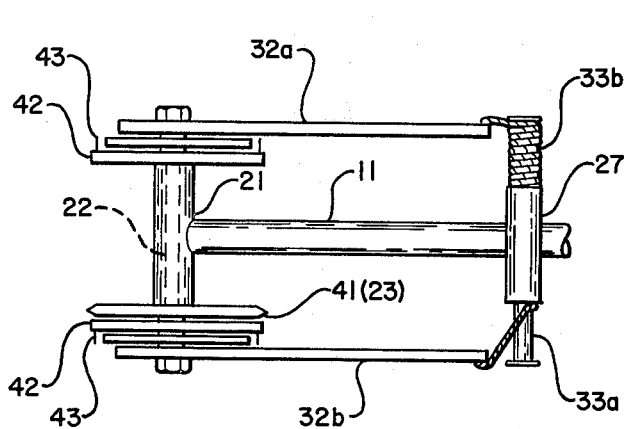
FIG. 2 is an enlarged section view taken along the vertical plane 2—2 of FIG. 1

From FIG. 1 and FIG. 2 it will be seen that for mounting the bearing tube 26 and the attachment shaft 27 journaled in it, a bracket 28 is secured to the upper tube 10 and the lower front tube 11 by clamping bolts 29.

At each end of the drive shaft 22 is pivoted a lever arm 32; for oscillation of the lever arms a pair of cables 33 attached one end of each to the tip of each lever arm at 33a and the other end of each cable wound around and anchored at each end of the attachment shaft 27 at 33b, one clockwise and the other counterclockwise. For regulating the distance of travel of each cable a turn-buckle 34 with left-and-right screw threads is fitted to each cable. For a stop to the travel of the cable 33 on attachment shaft 27 a compression spring 35 is fitted to the upper part of the turn-buckle 34. A weight 37 is suspended by a link chain 38 from the tip of each lever arm for gravity leverage by vertical pull.

The parts thus far described are identical to those in my applications Ser. No. 628,074 filed Nov. 3, 1975, now at issue deferred, Ser. No. 739,351 filed Nov. 5, 1976, and Ser. No. 810,948 filed June 29, 1977, both these last two now pending; and now I shall set forth the detailed specification of my improved embodiment of the noiseless ratchet drive mechanism that fit in with the parts described thus far, as follows: to drive the sprocket wheel 23 which is fixed to the drive shaft 22, on each end of the said drive shaft is keyed a first element 41 consisting of a driven-driver wheel 42 with a broad rim forming a band shell 43 with a cylindrical friction driving engagement means 44 disposed on the underside thereof. Contiguous to the driven-driver 42 and pivoting about the drive shaft 22 is disposed the second element 51 with a plural number of crank members 52. On each of the said crank member on the center line thereof at top is fixed a pin shaft 55, and at approximately the middle down the center line another pin shaft 57 is fixed. To make connection for the crank members to effect engagement with and disengagement of friction driving engagement means 44 an elongated cam 53 with a surface 56 at top of the same arc surface as the cylindrical friction driving engagement means 44 and with a round opening 54 near the top and off the vertical center line of the said cam turning on pin shaft 55, and with a limited crescent opening 58 at the lower end of said cam swinging about the pin shaft 57. A lever arm 32 is attached to each second element 51, for oscillation operation to drive the driven-drivers 42 in unidirectional motion with the sprocket wheel 23.

On each end of the drive shaft 22 is disposed a first element 41 consisting of a driven-driver wheel 42 keyed to drive shaft 22, the driven-driver wheel 42 with a broad rim 43 forming a band shell with a cylindrical friction drive engagement means 44 disposed on the underside thereof, and contiguous to the driven-driver wheel 42 pivoting about drive shaft 22 disposed a second element the crank wheel 51 consisting of a plural number of crank members 52, a cam 53 with an off center round opening 54 connected with crank member 52 at pin shaft 55 thereon, and cam 53 with a friction engagement surface 56 substantially of the same radius arc as the arc of the cylindrical friction engagement means 44, and the lengthwise lower end of the cam 53 with a crescent opening 58 of the radius of arc of pin shaft 55 swingable about pin shaft 57 on crank member 52, and a lever arm 32 is attached to each member of the second element the crank wheel 51.

I claim:

1. In an occupant propelled vehicle including a frame, a ground engaging wheel mounted on said frame, a driven sprocket for rotating said wheel, a drive sprocket, and an endless sprocket chain trained over said drive and driven sprockets, a drive shaft freely journaled concentric to said drive sprocket, a first lever arm disposed rotatable on one end of said shaft, a second lever arm disposed rotatable on the other end of said shaft; an attachment shaft journaled on said frame, a first cable having one end attached to the tip of one of said lever arms and the other end wound clockwise on said attachment shaft, and a second cable having one end attached to the tip of the other of said lever arm, and the othr end wound counterclockwise on said attachment shaft, and a turnbuckle with right-and-left threaded screws fitted to each of said cable whereby the cable length may be adjusted, and a compression spring mounted on said turnbuckle for moving into stopping engagement with said attachment shaft to limit the travel of said cables, and a leverage adding weight suspend from the tip of each of said lever arms by a link chain; and comprising a reciprocal lever friction drive mechanism for a man-powered vehicle, said mechanism consists of the first elements disposed keyed to both ends of the said drive shaft, each first element having cylindrical friction engagement means thereon; and a second element disposed contiguous and coaxial with each of the first element and rotatably relative thereto; a plurality of members connected to the second element adapted to frictionally engage and disengage the cylindrical friction engagement means and relative rotation of the second element in one direction causes engagement of the friction engagement, and opposite relative rotation causes disengagement of the friction engagement; and create a rotation of the drive shaft and simultaneously create a rotation of the sprocket wheel;

characterized by the adaptability of the drive mechanism to a manpowered propelled vehicle by fitting the mechanism to each end of the common driving shaft on which transmission of power generated is effected.

* * * * *